United States Patent
Lech

Patent Number: 5,678,469
Date of Patent: Oct. 21, 1997

[54] CREEPER DRIVE SYSTEM

[75] Inventor: Richard J. Lech, Burlington, Iowa

[73] Assignee: Case Corporation, Racine, Wis.

[21] Appl. No.: 560,042

[22] Filed: Nov. 17, 1995

[51] Int. Cl.$^6$ .......................... F15B 11/042; F15B 11/16
[52] U.S. Cl. .................. 91/516; 91/446; 74/720; 74/732.1
[58] Field of Search ................. 91/446, 512, 516; 60/422; 74/720, 732.1

[56] References Cited

U.S. PATENT DOCUMENTS

| | | |
|---|---|---|
| 4,051,868 | 10/1977 | Anderson ............. 91/446 |
| 4,132,132 | 1/1979 | Shaffer . |
| 4,250,794 | 2/1981 | Haak et al. ............ 91/446 |
| 4,271,723 | 6/1981 | Shaffer . |
| 4,704,777 | 11/1987 | Schaefer et al. . |
| 4,706,519 | 11/1987 | Beim . |
| 4,862,765 | 9/1989 | Schaefer et al. . |
| 5,105,675 | 4/1992 | Langford et al. . |

FOREIGN PATENT DOCUMENTS 580368  11/1977  U.S.S.R. .................. 91/446

*Primary Examiner*—F. Daniel Lopez
*Attorney, Agent, or Firm*—Jansson & Shupe, Ltd.

[57] ABSTRACT

A new creeper drive system has a hydraulic motor with first and second flow lines connected thereto. A directional valve apparatus is connected in the flow lines and the system has a flow control valve operable independently of the directional valve apparatus. The creeper drive system is particularly useful on a mobile construction machine. The machine hydraulic circuit needs but a single pump for powering the creeper drive motor and an auxiliary attachment motor and creeper direction and speed functions are independently adjustable.

9 Claims, 3 Drawing Sheets

CREEPER DRIVE SYSTEM

FIELD OF THE INVENTION

This invention relates generally to machine elements and mechanisms and, more particularly, to low-speed, i.e., "creeper" drive systems for mobile machinery.

BACKGROUND OF THE INVENTION

Mobile construction machines such as the popular loader/landscaper are called upon to perform a wide variety of tasks. Earthmoving, digging, truck loading, land contouring, driveway and parking lot construction, and cleanup operations are among them. And a number of attachments are available for such machines including mowers, snowblowers and sweepers. Such machines are often equipped with a rear hitch, power take-off (PTO) and a hydraulic system for towing and powering certain of those attachments. And hand-operated attachments such as pavement breakers, drills and the like may be used, as well. A leading manufacturer of loader/landscapers, truly versatile machines, is Case Corporation of Racine, Wis.

In drive train configuration, such machines have an engine driving rubber-tired wheels through a shifting gear train. Any one of three or four gear ratios can be selected and usually provides an appropriate machine speed for the work being performed. And some prior art machines, described below, use but a single gear ratio in each direction of travel.

However, some applications require very slow over-the-ground speed and even the highest gear ratio (resulting in the slowest speed) may be too fast. Merely as an example, a loader/landscaper may be equipped with a towed mower for cutting grass along highways and the like. Where the grass is of reasonable height and dry, the conventional geared transmission may provide a sufficiently low speed. But if such grass is unusually high, dense and/or wet, a very slow creeping speed may be needed to do an acceptable job of grass cutting.

One way to obtain a sufficiently-slow speed is to select the highest gear ratio and then throttle down the engine speed. But this has disadvantages. One is that at lower engine speed, the output horsepower of the engine is reduced. Another is that the rotational speed of the PTO, typically about 500 RPM, is reduced and the efficiency of attachments (e.g., the above-noted mower) driven by such PTO suffers.

In efforts to address these disadvantages, earlier workers in the field developed what are known as creeper drives, auxiliary drive systems capable of powering a machine at low speed. The arrangements disclosed in U.S. Pat. Nos. 4,132,132 (Shaffer) and 4,271,723 (Shaffer) are examples and involve a vehicle having one forward and one reverse gear set. One of the gear sets is selected by oil-pressurizing the appropriate main clutch. Normally, vehicle speed control is by controlling engine speed; that is, there is only a single gear ratio available in each direction of travel. Implements are powered by a pump separate from that used to power the hydraulic creeper motor.

The systems of the Shaffer patents include a creeper drive with an auxiliary pump and a hydraulic motor driving through an auxiliary clutch to one gear set. When the operator desires to use the creeper drive, a foot pedal is rocked to either side of its neutral position. Such pedal motion flows oil to the hydraulic motor along one of two lines (for forward or reverse travel) and simultaneously disables the main clutches. And the rotational speed of the hydraulic motor (and therefore of the vehicle) is proportional to the distance the pedal is rocked away from its center position.

U.S. Pat. No. 4,706,519 (Beim) involves a mechanical creeper drive having a higher-gear-ratio component. When creeping speed is desired, the component is "inserted" into the drive train using conventional clutches.

U.S. Pat. No. 5,105,675 (Langford et al.) describes a creeper drive that uses modulated hydraulically-actuated clutches to shift extra "creeper" gear reduction into or out of the drive train. Such drive train normally affords 16 speed ranges and the creeper capability is said to add another 16 speed ranges. U.S. Pat. Nos. 4,704,777 (Schaefer et al.) and 4,862,765 (Schaefer et al.) involve retrofitting a tractor with a creeper subassembly to provide a creep drive capability where none existed.

While these prior art arrangements have been generally satisfactory, they are not without disadvantages. For example, the systems of the Shaffer patents do not afford the capability of selecting, in non-creep applications, one of several different machine speeds using a shifting transmission while maintaining a high engine speed.

The Shaffer systems require two pumps, one each for implements and creeper drive, and there is no hydraulic "load sensing" capability. Employment of a pivoting foot pedal may make it difficult to hold a constant speed in rough terrain and the fact that such pedal is spring-biased to neutral means that the operator cannot set a creep speed and then turn attention to other tasks. Further, the directional and speed control functions are provided by the same motor control valve and control spool—speed and direction cannot be independently controlled.

While the arrangements described in the Beim and Langford et al. patents undoubtedly afford creep speeds, they do so through the conventional shifting vehicle transmissions rather than through an entirely independent creeper drive system. This means that the operator must vary engine speed to obtain slight changes in creeping speed.

An improved creeper drive system which overcomes some of the problems and shortcomings of prior art arrangements would be an important advance in the art.

OBJECTS OF THE INVENTION

It is an object of the invention to provide an improved creeper drive system overcoming some of the problems and shortcomings of the prior art.

Another object of the invention is to provide an improved creeper drive system which uses a common hydraulic pump for powering implements and vehicle wheels.

Another object of the invention is to provide an improved creeper drive system which drives at substantially constant over-the-ground speed in rough terrain.

Another object of the invention is to provide an improved creeper drive system which offers over-the-ground speed control independent of engine speed.

Still another object of the invention is to provide an improved creeper drive system which offers over-the-ground speed control at a substantially constant engine speed.

Another object of the invention is to provide an improved creeper drive system which is free of moduled or non-modulated clutches.

Yet another object of the invention is to provide an improved creeper drive system which includes a load-sensing capability for speed control.

Another object of the invention is to provide an improved creeper drive system offering adjustable creep speeds without gear shifting.

Another object of the invention is to provide an improved creeper drive system in which vehicle speed and direction are independently controlled. How these and other objects are accomplished will become apparent from the following descriptions and from the drawings.

SUMMARY OF THE INVENTION

An aspect of the invention involves a creeper drive system having a hydraulic motor with first and second flow lines connected to the motor. In the improvement, a directional valve apparatus (having first and second directional valves) is connected in the flow lines for directing fluid to such lines. A flow control valve is connected to the apparatus and is operable independently thereof for regulating the rate of flow of fluid to the motor. Creeper drive motor direction and speed are thus controllable independently of one another. And creeper drive motor speed is controllable independently of the speed of the engine of the vehicle on which the system is used.

The system includes a selector valve connected to the directional valves for controlling the positions of the latter. Such selector valve is configured for movement between a first creep-drive position and a second creep-drive position. Each directional valve moves between a biased position and a repose position and when the selector valve is in the first creep-drive position, the first directional valve is in the biased position and the second directional valve is in the repose position. That is to say, directional control of the creeper motor is achieved by moving one or the other of the directional valves but not both.

In another aspect of the invention, the system includes a load sensing device connected to the motor and providing a load-related signal along a control line, i.e., a signal that represents the pressure at which the motor is operating. In function, the signal limits the inlet pressure at the flow control valve. Such signal acts upon a first or motor circuit priority valve that is connected to the control line, to the flow control valve and to the system main flow line, the latter via a first flow path. Inlet pressure at the flow control valve is limited by limiting the maximum fluid flow rate to the flow control valve in response to the load-related signal.

In a highly preferred embodiment, the system also has a second or attachment priority valve connected to the control line and to the main flow line, the latter via a second flow line. The second priority valve helps assure that if the valves controlling an attachment, e.g., a towed mower, are open to tank, sufficient pressure can nevertheless be developed in the main flow line to operate the creeper motor.

In yet another aspect of the invention, the creeper drive system is part of a hydraulic circuit on a construction machine. Such circuit powers both the hydraulic creeper drive motor and an auxiliary hydraulic motor, the latter being mounted on a towed accessory equipment attached to the machine hitch. The exemplary mower may have two auxiliary hydraulic motors, namely, a hydraulic cylinder (a linear motor) for positioning the mower blade and a rotary hydraulic motor for powering such blade.

Further details of the invention are set forth in the drawings and the following detailed description.

DETAILED DESCRIPTION OF PREFERRED EMBODIMENTS

Figure 1:
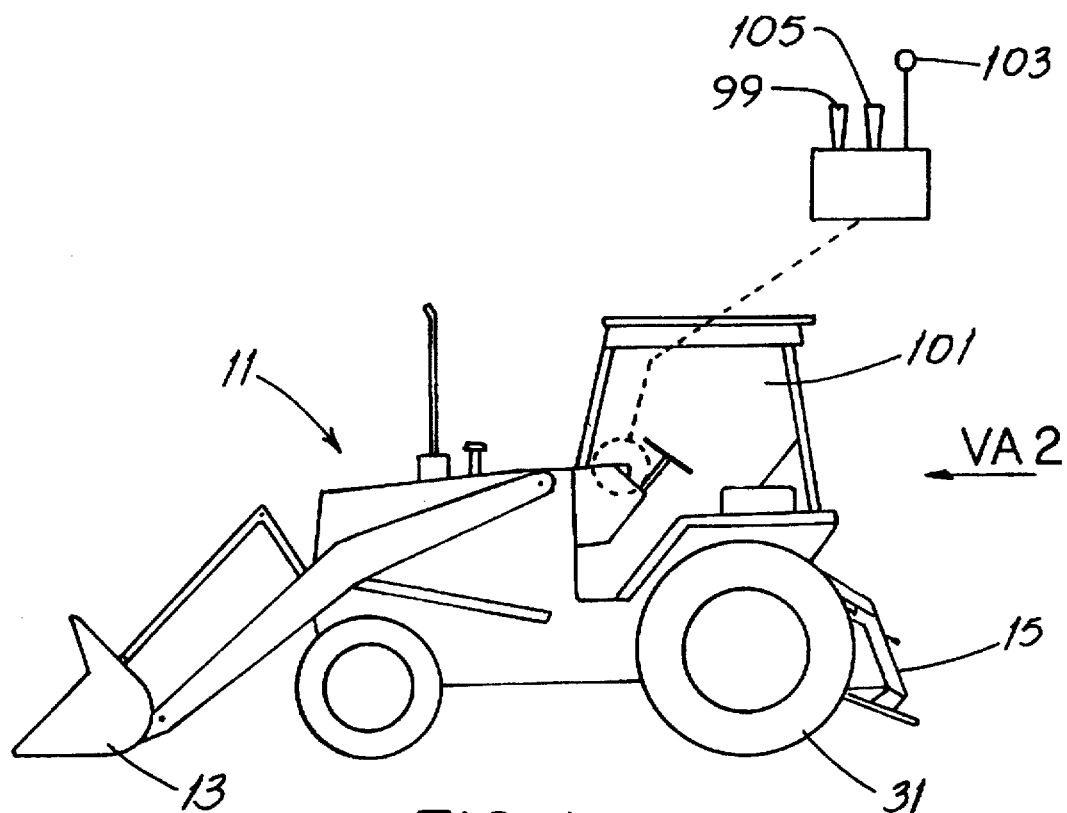
FIG. 1 is a representative side elevation view of a loader/landscaper, a type of machine with which the new creeper drive system may be used. An enlarged representation of certain machine control devices is included.
Figure 2:
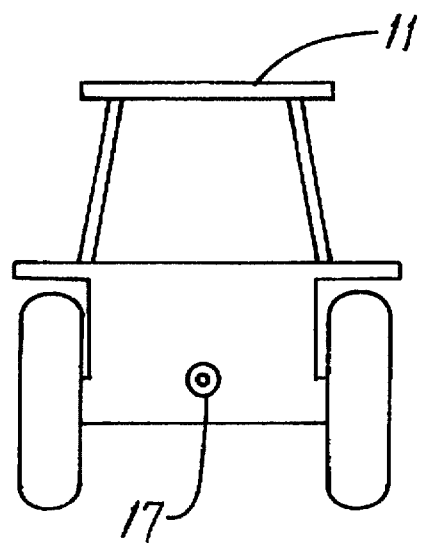
FIG. 2 is a representative rear elevation view of the loader/landscaper of FIG. 1 taken along the viewing axis VA2 thereof.

Understanding of the new creeper drive system 10 will be aided by first having an understanding of a type of mobile construction machine upon which such system 10 is particularly useful. Referring to the FIGURES, an exemplary machine 11 is a loader\landscaper having a front loader bucket 13, a rear three-point hitch 15 and a power take-off (PTO) shaft 17 for powering a towed attachment, e.g., a mower, coupled to the hitch.

The main vehicle transmission 19 is of the shifting type (using remotely-operable clutches) and affords several different gear ratios in much the same way as different gear ratios are afforded by a manual or automatic automotive transmission. Such transmission 19 has two inputs 21 and 23, one each from the vehicle engine 25 and the creeper drive hydraulic motor 27, respectively. The engine 25 or the motor 27 provide over-the-ground motive power through an output shaft 29 to the machine wheels 31.

The engine 25 is coupled to and uncoupled from the transmission 19 by a conventional clutch 33, e.g., a power-operated hydraulic clutch. When the engine 25 is powering the machine 11 through the clutch 33 to the transmission 19 and wheels 31, "windmilling" of the hydraulic motor 27 is prevented by a mechanical overrunning clutch 35 (e.g., a "dog" clutch) between such motor 27 and the transmission 19. To put it in other words, the motor 27 is prevented from being driven through the transmission 19 by the engine 25. From FIGS. 1 and 3 and the foregoing description, it is apparent that when the engine 25 or the creeper motor 27 is powering the wheels 31, machine over-the-ground speed is a function of the selected gear ratio of the transmission 19 and the rotational speed of either the engine 25 or the creeper motor 27, as the case may be.

Figure 3:
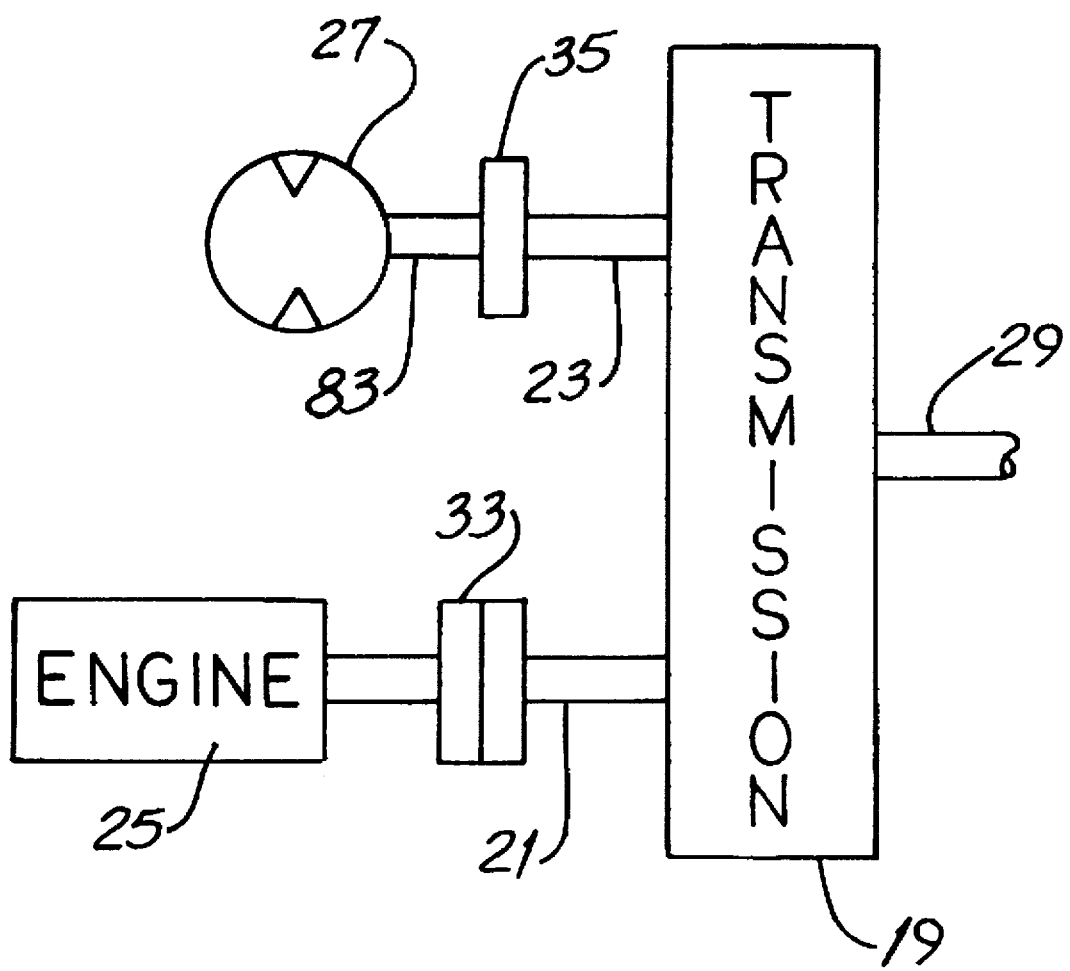
FIG. 3 is a representative diagram showing the arrangement of the machine's mechanical drive train using the engine or the hydraulic creeper motor to power such machine. Parts are broken away.
Figure 4:
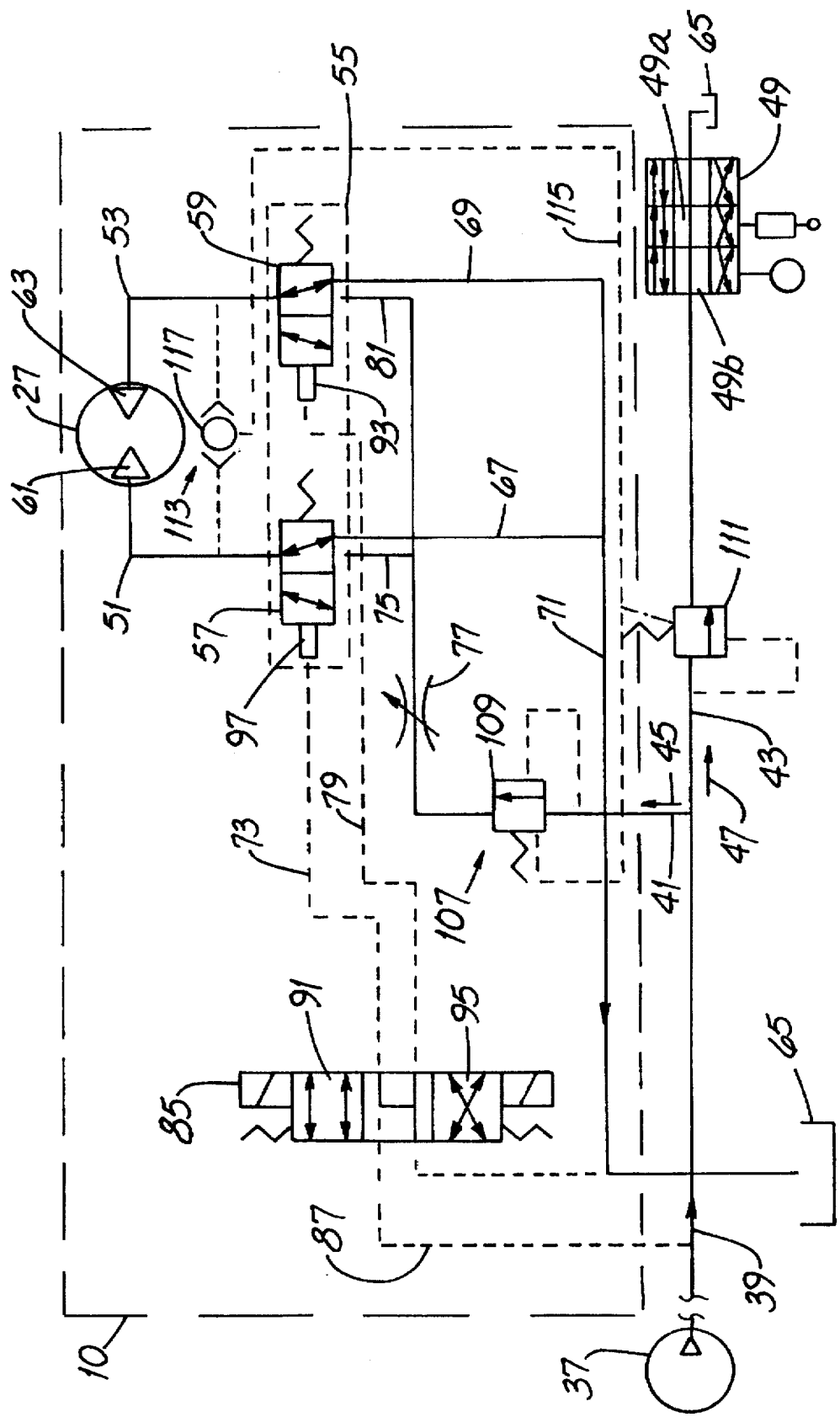
FIG. 4 is a hydraulic circuit diagram of the new creeper drive system shown in conjunction with a main hydraulic line and hydraulic valves for operating a hitch, machine attachments or the like. Larger-diameter, higher-flow-rate hydraulic lines are solid and smaller-diameter pilot and control signal lines are dashed.

Referring particularly to FIGS. 3 and 4, the machine 11 has a hydraulic pump 37 driven by the engine 25 to provide hydraulic fluid along a main flow line 39 to first and second flow lines 41 and 43, respectively. The lines 41, 43 define first and second flow paths 45, 47, respectively, and in FIG. 4, the paths 45, 47 are represented by arrows identified by the same numerals.

Preferably, such pump 37 is a fixed-displacement pump and its output (in fluid volume per unit time) is substantially proportional to engine speed. An attractive feature of the inventive creeper drive system 10 is that when using such system 10, the machine "over the ground" speed is controlled independently of engine speed. Engine speed is preferably maintained at a high level, e.g., 2200–2400 RPM.

Fluid flowing in the first flow path 45 powers the creeper motor 27 while fluid flowing in the second flow path 47 feeds valves 49 in the line 43. Such valves 49 control the hitch 15 and a hydraulically-powered attachment such as an exemplary mower.

Referring particularly to FIG. 4, the new creeper drive system 10 will be described in detail. Such system 10 has directional, speed/flow-control and load-sensing features which will be described in that order. Such descriptions are followed by a description of the operation of the new system 10.

Directional Control

The creeper drive motor 27 has first and second flow lines 51 and 53, respectively, connected thereto. A directional valve apparatus 55 is connected to the lines 51, 53 and directs fluid to them. In a specific embodiment, the apparatus 55 includes first and second directional valves 57 and 59, respectively. Such valves 57, 59 are urged by springs to the repose position as shown and when in such position, both motor ports 61, 63 and the lines 51, 53, are connected to the hydraulic tank 65 along the lines 67, 69, 71.

If the valve 57 is biased rightwardly by pilot pressure in the pilot line 73 (as described in more detail below), a connection is thereby made between the line 75 from the flow control 77 and the first flow line 41 to the motor flow line 51. Similarly, if the valve 59 is biased rightwardly by pilot pressure in the pilot line 79, a connection is thereby made between the line 81 from the flow control 77 and the second flow line 53 to the motor 27.

The valves 57 and 59 function as follows. When the valve 57 is in its biased position and the valve 59 is in its repose position, fluid flows from the flow control 77 through the line 75 and the line 51 into the motor port 61, out of the motor port 63 along the line 53, through the valve 59 and along the lines 69, 71 to the tank 65. The motor shaft 83 (shown in FIG. 3) thereby turns and the machine 11 moves in a particular direction.

And when the valve 59 is in its biased position and the valve 57 is in its repose position, fluid flows from the flow control 77 through the line 81 and the line 53 into the motor port 63, out of the motor port 61 along the line 51, through the valve 57 and along the lines 67, 71 to the tank 65. The motor shaft 83 thereby turns in the opposite direction and the machine moves in such opposite direction.

When the selector valve 85 is centered (as shown), the creeper drive system 10 is inactivated. And whether pilot it is line 73 or 79 which is pressurized (for creeper drive operation in one direction of travel or the other) is determined by the direction in which the selector valve 85 is biased. Such valve 85 is preferably a three-position, spring-centered, solenoid-operated valve. The source of pilot pressure is the main flow line 39 and the input pilot line 87. (The latter is a small-diameter line and may have an orifice therein to prevent excessive "bleeding" from the line 39.)

With the selector valve 85 in its centered position as shown, the pilot lines 73, 79 and the input pilot line 87 are connected to tank 65 along the pilot tank line 89. Both valves 57, 59 are in their repose positions, both motor ports 61, 63 are connected to tank 65 and the motor shaft 83 does not turn.

With the selector valve 85 urged downwardly (in the view of FIG. 4) so that the symbol "envelope" 91 is aligned with the pilot lines 73, 79, biasing pilot pressure is applied to the valve 57 along the output pilot line 73. The valve 59 remains in its repose position because its pilot chamber 93 is connected to the tank 65 along the line 79 and the motor shaft 83 turns in one direction.

With the selector valve 85 urged upward so that the symbol envelope 95 is aligned with the pilot lines 73, 79, biasing pilot pressure is applied to the valve 59 along the pilot line 79. The valve 57 remains in its repose position because its pilot chamber 97 is connected to the tank 65 along the line 73 and the motor shaft 83 turns in the opposite direction.

Referring again to FIG. 1, in a specific embodiment, the machine 11 has an electrical forward-reverse selector switch 99 in the operator's cab 101. When moving under direct engine power, such switch 99 permits operation of the main forward or reverse clutches using a forward-reverse hand lever 103. When the machine 11 is equipped with the creeper drive system 10, such machine 10 also has a creeper selector device 105 which switches the output of the electrical forward-reverse selector switch 99 from the main forward or reverse clutches to a circuit for the selector valve 85. Thereafter, such selector valve 85 may be urged one direction or the other as described above by using the forward-reverse hand lever 103 normally used to select direction of travel when the machine 11 is being powered directly by the engine 25.

Creeper Drive Speed Control

When the creeper drive system 10 is in use, vehicle speed is regulated by a flow control section 107 which includes a first priority valve 109 in the first flow line 41, a second priority valve 111 in the second flow line 43 and a flow control valve 77 in "downstream series" relationship to the priority valve 109. The flow control valve 77 controls the rotational speed of the motor 27 and the machine operator selects such speed (and, therefore, the machine over-the-ground "creep" speed) by setting, in effect, a pressure drop across such valve 77. Fluid flow rate to the motor 27 stabilizes at that flow rate which results in the selected pressure drop.

The priority valve 111 helps assure that hydraulic fluid is provided to the first priority valve 109 and thence to the motor 27 even though there may be no hitch load, i.e., even though the valves 49 in the line 47, e.g., those valves 49a and 49b controlling the hitch 15 and attachments, respectively, are open-centered to tank 65. (It will be recalled that fluid under pressure follows the path of least resistance. Without the second priority valve 111, fluid would flow freely along the line 43 to the tank 65 when the valves 49 are open-centered.)

Such second priority valve 111 performs this function by being normally closed and piloting open only if the pressure in the main flow line 39 to the priority valve 109 is somewhat above the total of (a) the set point pressure (spring pressure) of the second priority valve 111 and (b) the load-related pressure from the load-sensing device 113 as such pressure is directed to the second priority valve 111 by the line 115. In the preferred embodiment, the spring pressure setting of the second priority valve 111 is slightly higher than that of the first priority valve 109.

Load Sensing

The load-sensing device 113 connected to the motor ports 61, 63 provides a load-related pressure signal along the control line 115 to both priority valves 109, 111. In a preferred embodiment, the device 113 is a bi-directional check valve. Such signal is nominally equal to the pressure at the input port to the motor 27 (whichever port 61 or 63 that may be) and represents the load on the motor 27. Such pressure signal is also nominally equal to the pressure on the downstream side of the flow control valve 77, i.e., in lines 75, 81.

That is, the pressure value of the signal along the control line 115 is a direct function of the torsional load on the motor shaft 83. A motor 27 that is lightly loaded torsionally (even though it may be rotating at high speed) will result in a lower pressure signal. And a motor 27 that is heavily loaded torsionally (even though it may be rotating at low speed) will result in a higher pressure signal. In any event, motor speed is a function of the setting of the flow control valve 77 and is substantially independent of motor load.

Operation

Referring to the FIGURES, in operation, it is assumed that the machine operator wishes to use the new creeper drive system 10. Using the procedure described above, such operator sets the creeper selector device 105 to CREEP (or similar designation) and manipulates the forward-reverse hand lever 103. The flow control valve 77 is also set approximately at the desired creep-speed setting.

It is assumed the operator wishes to go forward and that such selection causes the selector valve 85 to be switched so that the envelope 91 is aligned with the pilot lines 73, 79. Biasing pilot pressure is applied to the valve 57 along the pilot line 73 but the valve 59 remains in its repose position because its pilot chamber 93 is connected to the tank 65 along the line 79. The system 10 is thereby "set up" so that fluid from the flow control valve 77 enters the motor port 61 and the motor rotates in the assumed forward direction.

If the valves 49 in the line 43 are open-centered to tank 65 as shown, there will be little pressure in such line 43 and the second priority valve 111 will be closed as shown. Consequently, pressure in the line 43 will increase and provide fluid flow to the first priority valve 109 and thence to the flow control valve 77 and to the motor 27. If the valves 49 are in operation, the pressure in the line 43 will be elevated, the priority valve 111 will be open but the pressure in the line 41 will be adequate to "feed" the priority valve 109, flow control valve 77 and motor 27.

As the machine 11 starts to move at creep speed, the check ball 117 in the load sensing device 113 moves to the right as in FIG. 4 and a load signal is propagated along the line 115 to the priority valves 109, 111. The system 10 attains equilibrium for the particular setting of the flow control valve 77. Such equilibrium occurs in part because the priority valves 109, 111 modulate in a manner to cause sufficient fluid flow in the flow control valve 77 to result in the set pressure drop across such valve 77.

While the principles of the invention have been shown and described in connection with specific embodiments, it is to be understood clearly that such embodiments are by way of example and are not limiting.

What is claimed:

1. In a creeper drive system for ground-propulsion of a vehicle having a transmission and a transmission input shaft powered by an engine, the system having a fluid-powered hydraulic motor powering another input shaft to the transmission, the motor having first and second flow lines connected thereto, the improvement comprising:

a first directional valve connected to the first flow line and having two flow paths therethrough;

a second directional valve connected to the second flow line and having two flow paths therethrough; and a flow control valve connected to the directional valves and operable independently thereof for regulating the rate of flow of fluid to the motor; and a normally-closed priority valve flowing fluid to the flow control valve;

and wherein:

the motor rotates in either of two directions of rotation;

for either direction of rotation, fluid flows through one of the flow paths in each directional valve.

2. The system of claim 1 wherein:

the system includes a selector valve connected to the directional valves and configured for movement between a first creep-drive position for rotating the motor in one direction of rotation and a second creep-drive position for rotating the motor in the other direction of rotation.

3. The system of claim 2 wherein:

each directional valve is configured for movement between a biased position and a repose position; and the first directional valve is in the biased position and the second directional valve is in the repose position when the selector valve is in the first creep-drive position.

4. The system of claim 1 wherein the motor operates at a pressure and the system includes:

a load sensing device connected to the flow lines and providing a signal along a control line that represents the pressure; and the control line is connected to the priority valve.

5. The system of claim 4 in combination with the vehicle and wherein the flow control valve regulates the rate of fluid flow to the motor independently of the speed of the engine.

6. The combination of claim 5 wherein the priority valve is a first priority valve and is connected to a main flow line and the system includes a second priority valve connected to the main flow line.

7. In a construction machine having (a) an engine, and (b) a hydraulic circuit for powering a creeper motor at a speed, the improvement wherein the circuit includes:

a single pump powering the motor through a main flow line and respective first and second flow paths;

a flow control valve in the first flow path between the pump and the motor for regulating the speed of the motor, such flow control valve having an inlet pressure and an outlet pressure;

a load sensing device coupled to the motor for limiting the inlet pressure;

first and second directional valves connected to the motor, each directional valve being mounted for movement between a repose position and a pressure-biased position;

a selector valve connected to the first and second directional valves by an output pilot line, such selector valve being mounted for movement between a first creep-drive position and a second creep-drive position;

an input pilot line extending between the main flow line and the selector valve;

and wherein:

the motor rotates in either of first and second directions of rotation;

when the selector valve is in the first creep-drive position, pressure in the output pilot line is applied to the first directional valve;

the first directional valve is in the pressure-biased position; and the second direction valve is in the repose position.

8. The machine of claim 7 wherein the circuit includes:

first and second priority valves in the first and second flow paths, respectively; and the load sensing device is connected to the priority valves by a control line.

9. The machine of claim 7 wherein the directional valves and the flow control valve are operable independently of one another.

* * * * *

UNITED STATES PATENT AND TRADEMARK OFFICE
CERTIFICATE OF CORRECTION

PATENT NO. : 5,678,469
DATED : October 21, 1997
INVENTOR(S) : Richard J. Lech

It is certified that error appears in the above-indentified patent and that said Letters Patent is hereby corrected as shown below:

In Column 5, line 39, delete "pilot."

In Column 5, line 40, add --pilot-- between "is" and "line."

Signed and Sealed this

Twenty-fourth Day of March, 1998

Attest:

BRUCE LEHMAN

*Attesting Officer*          *Commissioner of Patents and Trademarks*